Feb. 16, 1954 A. S. BADGER 2,669,213
PRESSURE INDICATING DEVICE
Filed Dec. 16, 1950 2 Sheets-Sheet 1

INVENTOR.
Algernon S. Badger,
BY
AGENT.

Feb. 16, 1954     A. S. BADGER     2,669,213
PRESSURE INDICATING DEVICE
Filed Dec. 16, 1950     2 Sheets-Sheet 2

INVENTOR.
Algernon S. Badger,
BY

AGENT.

Patented Feb. 16, 1954

2,669,213

UNITED STATES PATENT OFFICE 2,669,213

PRESSURE INDICATING DEVICE

Algernon S. Badger, Houston, Tex., assignor, by mesne assignments, to Standard Oil Development Company, Elizabeth, N. J., a corporation of Delaware Application December 16, 1950, Serial No. 201,223

3 Claims. (Cl. 116—114)

The present invention is directed to a device for indicating pressure. More specifically, the invention is directed to a device for indicating high pressures under conditions of stress and rotation.

The present invention may be briefly described as a device for indicating pressure which includes a supporting member carrying at least a first pulley which is arranged above the supporting member and at least a second pulley carried by the supporting member and arranged below it. A third pulley is mounted on the supporting member at a point intermediate the first and second pulleys. A stationary piston guide member is arranged in the supporting member and defines a passageway connected to a source of fluid pressure. Embracing the guide member is a piston which defines therewith a piston cylinder in fluid communication with the passageway. A compression means is arranged in the supporting member and bears against and normally urges the piston upwardly. Arranged below the supporting member and carried thereby is a wheel, such as a sprocket wheel, which is operatively connected to the second pulley. A free end of the piston is connected to the wheel by suitable connecting means, such as a chain which engages with the sprocket wheel and is attached thereto. A cable is connected to the second and third pulleys and extends over the first, second and third pulleys, the third pulley provided with means for maintaining tension on the cable, the tension means being connected to the third pulley. The cable carries an indicator, such as a suitable arm or bar, for registering pressure on a scale connected to an exterior surface of said supporting member on entrance of fluid into the piston cylinder under a pressure sufficient to overcome the force exerted by the compression means against the piston.

The device of the present invention is suitable for employment where a supply of fluid pressure is available, such as a hydraulic fluid pressure. The invention has particular application to a torque indicating device, such as described in an application for Robert R. Crookston and James S. Waters entitled "Torque Indicating and Shock Absorber Device" and filed December 16, 1950. The device is of rugged construction and is designed to endure vibrations and rotational stress.

The invention will be described in further detail by reference to the drawing in which Fig. 1 is a front elevational view in partial section of the apparatus of the present invention;

Figure 2:
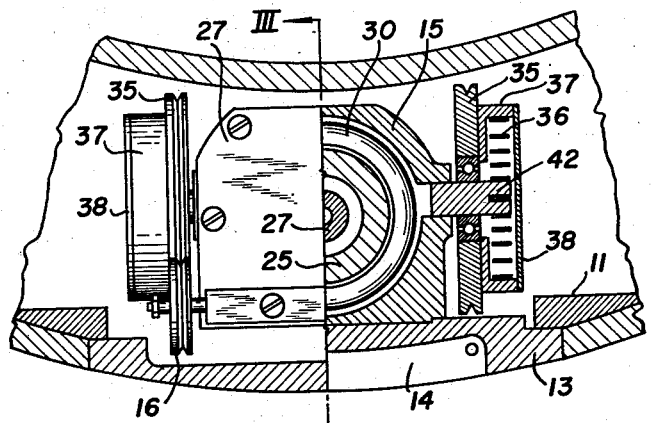
Fig. 2 is a view taken along the lines II—II of Fig. 1.

Referring now to the drawing and to Figs. 1 to 4, numeral 11 represents a frame member for the indicating means generally designated as 12. This indicating means is arranged in a housing 13 provided with a window 14 in which the indicating means 12 is located. The indicating means 12 defines a supporting member 15 which is attached to the housing 13. The gauging or indicating means is provided with a first pair of pulleys 16 and a second pair of pulleys 17. Pulley 16 is carried by a shaft 18 attached to the supporting member 15 and is firmly affixed thereto by a nut 19. Pulley 17 is carried by a shaft 20 arranged in a bearing 21 carried by an extension member 22 of the supporting member 15. Shaft 20 is provided with a sprocket wheel 23 which is attached to a chain 24 which, in turn, is attached to a piston member 25. The supporting member 15 and piston 25 define an internal piston cylinder 26 surrounding a stationary guide member 27 which defines a central passageway 28 connecting to a source of fluid pressure by conduit 29. The piston 25 is embraced by a compression or biasing means 30 such as a helical coil spring which urges the piston 25 in an upward direction in the supporting member 15. The guiding or stationary member 27 and the piston member 25 are provided with a sealing means, such as an O-ring 31. A guide bushing 32 is arranged in a space 33 defined by the piston 25 and the member 27 and embraces recirculating balls 34 arranged therein. Sleeve 32 serves as a ground bearing race and return passage for the balls.

The indicating means 12 is provided with a third pair of pulleys 35 which carries a flat coil spring 36 which is encased in a housing 37 provided with a cover plate 38. Attached to pulleys 17 by a clamp 39 is a cable 40 which passes over pulley 16 and is attached to pulley 35 by screw 41. Pulley 35 is arranged on a shaft 42 carried by the supporting member 15. The spring 36 is attached to the pulley 35 by a suitable connection means such as a screw 36a and to the shaft 42 as shown. Arranged on the cables 40 of which there are two in number is an indicator bar 43 which is displayed in the window 14 of the housing 13.

Figure 1:
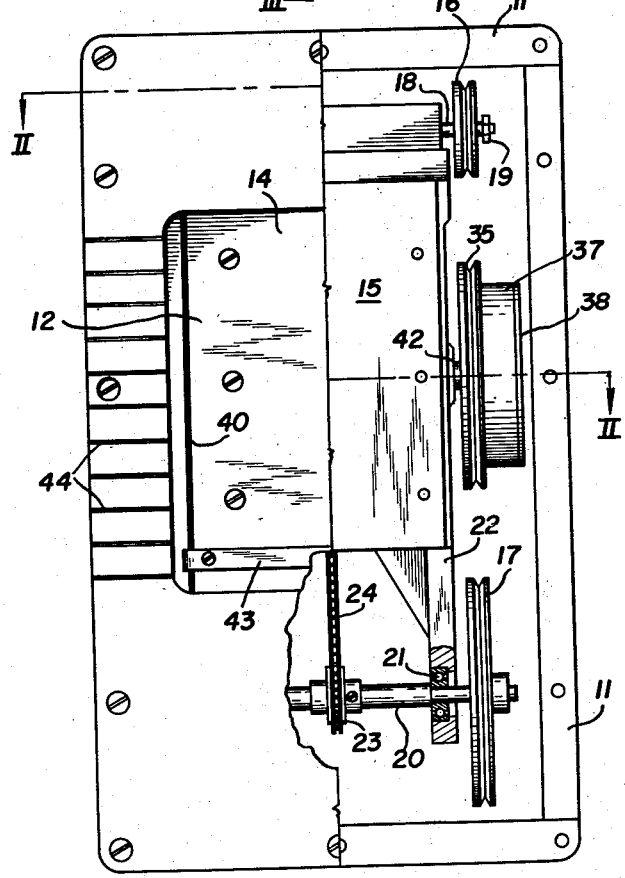
Figure 3:
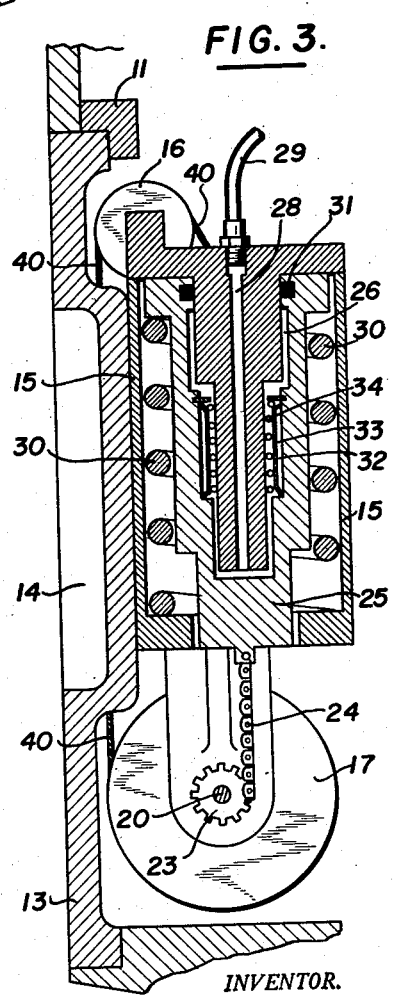
Fig. 3 is a view taken along the line III—III of Fig. 2.
Figure 4:
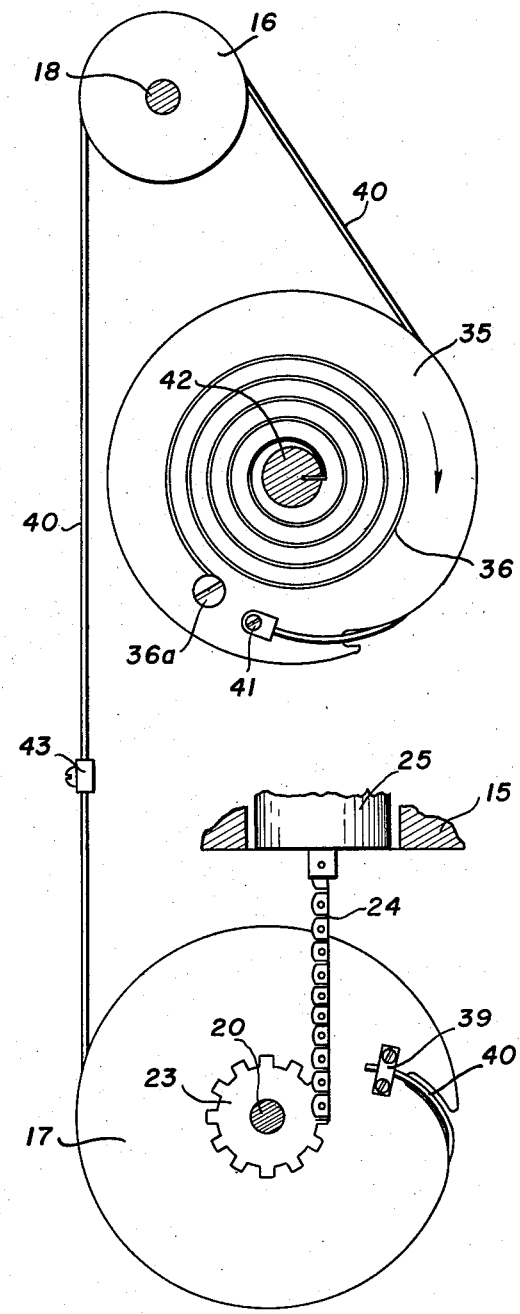
Fig. 4 is a view with parts cut away similar to Fig. 3 showing the arrangement of the elements thereof.

This indicator bar 43 may be suitably arranged in juxtaposition with vertically spaced markings 44 as shown in Fig. 1.

The device of the present invention operates as follows:

As a result of fluid pressure being transmitted through conduit 29 through a hydraulic fluid therein being acted on by compressive force, hydraulic fluid is forced into passageway 28 of the indicating means 12. The hydraulic fluid causes the piston 25 to move downwardly which permits rotation of the sprocket wheel 23 through chain 24 which, in turn, permits rotation of the pulley 17 and the pulley 16 by cable 40, tension being maintained on the cable 40 by spring 36 which causes the cable 40 carrying the indicator 43 to move upwardly allowing pressure or force to be indicated on the scale markings 44.

The nature and objects of the present invention having been completely described and illustrated, what I wish to claim as new and useful and to secure by Letters Patent is:

1. A pressure signalling device which comprises a supporting member, at least a first pulley carried by and arranged above said supporting member, at least a second pulley carried by and arranged below said supporting member, at least a third pulley mounted on said supporting member at a point intermediate said first and second pulleys, a sprocket wheel carried by said supporting member by means common to said second pulley and operatively connected thereto, a chain connected to and engageable with said sprocket wheel adapted to rotate said sprocket wheel by movement of said chain into engagement with said sprocket wheel by a pressure responsive actuating member connected to one end of the chain, at least a cable connected to said second and third pulleys and extending over said first, second and third pulleys, means for maintaining tension on said cable connected to said third pulley, and an indicator bar carried by said cable adapted for registering pressure on a graduated scale carried by said supporting member cooperating with said indicator bar on rotation of said sprocket wheel responsive to movement of said chain by said pressure responsive actuating member into engagement with said sprocket wheel.

2. A device in accordance with claim 1 in which the compression means is a helical coil spring and the tension means is a flat coil spring.

3. A device in accordance with claim 1 in which the tension means is a flat coil spring arranged in a housing mounted on said third pulleys.

ALGERNON S. BADGER.

References Cited in the file of this patent

UNITED STATES PATENTS

| Number | Name | Date |
|---|---|---|
| 1,634,785 | Laflin | July 5, 1927 |
| 1,701,412 | Lawrenz | Feb. 5, 1929 |
| 1,843,479 | Caille | Feb. 2, 1932 |
| 2,137,495 | Kershaw | Nov. 22, 1938 |
| 2,502,832 | Dockendorff | Apr. 4, 1950 |